US008510647B2

(12) United States Patent
Madden

(10) Patent No.: US 8,510,647 B2
(45) Date of Patent: Aug. 13, 2013

(54) COMPUTER PROGRAMMING AND MARKUP LANGUAGE SOURCE CODE VISUALIZATION TOOL

(76) Inventor: Jennifer Madden, Seattle, WA (US)

( * ) Notice: Subject to any disclaimer, the term of this patent is extended or adjusted under 35 U.S.C. 154(b) by 1010 days.

(21) Appl. No.: 11/787,017

(22) Filed: Apr. 13, 2007

(65) Prior Publication Data

US 2007/0256062 A1 Nov. 1, 2007

Related U.S. Application Data

(60) Provisional application No. 60/746,030, filed on Apr. 29, 2006.

(51) Int. Cl.
*G06N 3/00* (2006.01)

(52) U.S. Cl.
USPC .......................................................... 715/236

(58) Field of Classification Search
USPC .......................... 715/234, 243, 254, 255, 236
See application file for complete search history.

(56) References Cited

U.S. PATENT DOCUMENTS

| | | | | |
|---|---|---|---|---|
| 6,636,250 | B1 * | 10/2003 | Gasser | 715/853 |
| 6,976,209 | B1 * | 12/2005 | Storisteanu et al. | 715/201 |
| 7,287,274 | B1 * | 10/2007 | Houlding | 726/11 |
| 7,322,023 | B2 * | 1/2008 | Shulman et al. | 717/112 |
| 7,412,649 | B2 * | 8/2008 | Emek et al. | 715/235 |
| 7,574,675 | B1 * | 8/2009 | Linker et al. | 715/841 |
| 2003/0140045 | A1 * | 7/2003 | Heninger et al. | 707/10 |
| 2004/0261059 | A1 * | 12/2004 | Spencer et al. | 717/120 |
| 2005/0076312 | A1 * | 4/2005 | Gardner et al. | 715/853 |
| 2005/0108682 | A1 * | 5/2005 | Piehler et al. | 717/110 |
| 2006/0150150 | A1 * | 7/2006 | Tiwari et al. | 717/110 |
| 2007/0028189 | A1 * | 2/2007 | Robbins | 715/853 |
| 2007/0277149 | A1 * | 11/2007 | Stevens | 717/105 |

OTHER PUBLICATIONS

Bors et al., "Cascading Style Sheets level 2, CSS2 Specification," May 12, 1998.*

* cited by examiner

*Primary Examiner* — Kyle Stork

(57) ABSTRACT

The present invention creates visual depiction of implied delineation within the source code of programming and markup languages for the purpose of simplifying visual and manual navigation. The present invention can easily identify where commands start and stop, making the writing and debugging process much easier. It clearly defines nested containers in an intuitive way, which allows for quick, clear and easy analysis of source code. The user who employs source charting can easily identify structure and hierarchy and thereby efficiently debug source code and/or make any changes or modifications that are necessary. Those new to the containment concept will with one glance at a source chart be over the learning curve. Intermediate and advanced developers can more efficiently track down bugs and/or make modifications in even complex documents. These drawn containers are collapsible and expandable, further making the data easy to understand and navigate.

12 Claims, 6 Drawing Sheets

COMPUTER PROGRAMMING AND MARKUP LANGUAGE SOURCE CODE VISUALIZATION TOOL

CROSS REFERENCE TO RELATED APPLICATION

This application claims the benefit of earlier priority based upon the filing of a provisional application Ser. No. 60/746,030, which was filed on Apr. 29, 2006.

BACKGROUND OF THE INVENTION

1. Field of the Invention

This invention relates generally to a visualization tool for computer programming and markup language source code.

2. Background

Debugging source code can be a difficult task, even under the best of circumstances. This is owed to the fact that code is written with grammatical and syntactical opening and closing commands, with any number of commands and attributes in between. In the case of plain text files, indentation is only able to convey grouping boundaries, but cannot indicate any additional information about the grouping. Syntax coloring is used to indicate the nature of specific pieces of grammar, but does not convey anything about grouping boundaries or any additional information about the grouping. In both cases, a user must read the source code to gain any insight about the grouping and its parts. In the case of graphical user interface systems, source code is represented with graphics; it is not displayed at all, or is displayed incompletely. While source code presentation systems commonly allow the user to toggle back and forth between the plain text source code and a graphical user interface, they do not present the source code and the GUI together simultaneously.

Employing a graphical user interface along with the source code would be desirable because it would allows a person viewing the information to both read it in the same way they would read a plain text file containing the code, and also scan and recognize certain characteristics of the source code without having to read the code. This would be an advancement over current source code presentation methods which, in the case of plain text files absent of graphical user interface systems, employs indentation, line breaks and/or syntax coloring, and in the case of graphical user interface systems, presents only graphics which represent and replace source code.

Therefore, what is needed is a tool which graphically delineates the grammatical and syntactical boundaries of computer programming and markup language source code groupings in order to present them as individual units and to convey their hierarchical placement in relation to other groupings within the context of their environment. Still further, what is needed is a tool which classifies the nature and/or function of these groupings by color-coding and/or differentiating the boundaries using varying boundary lines such as solid or dashed. By using these types of delineations as a graphical user interface in concert with the actual data, and by making them collapsible and expandable, computer programming and markup language source code would become visually organized and thus can be more easily interpreted, navigated and intuitively understood by the person viewing the information.

SUMMARY OF THE INVENTION

The present invention advantageously fills the aforementioned deficiencies by providing a tool which enables the visualization of actual source code grouping boundaries which exist within computer programming/markup language source code by enclosing the groupings within box-like containers. Further, the present invention clearly depicts a grouping's hierarchical location within the context of computer language programs and documents, and visually expresses the parent-child and/or sibling relationships of multiple groupings by placing them within both nested and linear-placed containers. The graphical delineation provided for by the containers enables an explicit visual depiction of structure and hierarchy that presently is only implied using various indentation methods and/or line breaks, or determined only by reading through each line of source code to find stop and start point syntax and grammar. Broader or narrower views of the structure and hierarchy of the data can be achieved by making the containers collapsible/expandable. Still further, the present invention is able to visually classify data groupings by assigning specific colors to the backgrounds and borders of the containers, and by assigning various types of borders, indicating the type of data they contain and other information about the grouping. Color-coding the containers eliminates the need to read each line of source code to understand a grouping's function, and further conveys its function in relation to parent, child and sibling groupings. The nesting of the containers provides functionality which eliminates the need for tedious scrolling up and down to see how deeply nested a grouping is; the person viewing the source code only needs to look to the left and/or right of a container to ascertain the hierarchical location of a grouping. Color coding the containers is also useful here because the varying colors make viewing groupings' hierarchical placement easier and more clear when looking directly to the left and/or right of a container.

In one particular embodiment of the present invention the visualization tool could be programmed in a browser extension. In this particular embodiment the present invention advantageously enables, among other things, debugging and navigating source code hierarchies. This embodiment allows for an alternative to the built-in browser "View Page Source", which displays HTML and XHTML tags strewn together often on few lines, with no indentation or line breaks or very poor, inconsistent indentation due to poor formatting by the original page author, or because server side programs which pull pieces of web pages together from different sources do not take extra time to format the source code. This embodiment offers users an alternative way to navigate, view, debug, and understand their web page source code be it static, or dynamically generated. In this embodiment, this invention is also advantageous in that it allows a user to collapse parts and pieces of the document structure, allowing for multiple, broader and narrower views of the source code within the browser view port.

In still another embodiment of the present invention the visualization tool could be programmed into the User Interface of any software which is used to view and navigate through file/folder systems. In this embodiment the present invention advantageously enables, among other things, a much simpler, clearly organized and defined view of folder hierarchies and file containment systems. This is much improved over the "folder tree" view used in Windows OS, which only implies folder (directory) hierarchies using indentation and dashed lines connecting a parent folder name/icon to a child folder/icon. In this case, the indentation and dashed connecting line enables user to perceive the current folder's place in relation to other folders only from one side of the folder icon and folder name label. This invention, when embodied as the GUI of software used to view file/folder systems, explicitly draws a box-like container around the four sides of the folder name (and optional folder icon), making the nested containment of the folder in relation to its containing folder and/or folders it may contain clear and concise. The container will expand to display all folders/files it may contain. Further, this visualization tool assigns colors and borders to nested folders, which are used to indicate the folder's position in relation to the currently selected folder (root level, $2^{nd}$ level, $3^{rd}$ level, etc.).

In still other embodiments of the present invention the visualization tool could be used by computer programming and markup language text editors while writing source code. The visualization tool could be: (1) included in browsers as a development tool to show developers the 'charted' result of their source code; (2) used by teachers/instructors at any level as a visual aid tool to explain containment and hierarchy of specific computer data; (3) used by operating systems as the GUI for viewing/navigating file and folder hierarchies; (4) used by websites as a navigational GUI (i.e., for navigating through a website); (5) used by any type of software which creates HTML or other web documents, specifically but not limited to those software packages that are commonly referred to as What You See Is What You Get (WYSIWYG). In these embodiments the present invention advantageously enables, among other things, the clear, organized, and defined position of innately grouped data in relation to other related grouped data.

It is therefore an object of the present invention to provide collapsible/expandable containers which depict boundaries and which are assigned specific colors and borders to indicate the type of data or other important information about the data the containers embody.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

FIG. **4*b*** is an example of one particular implementation of the present invention in action.

Figure 5:
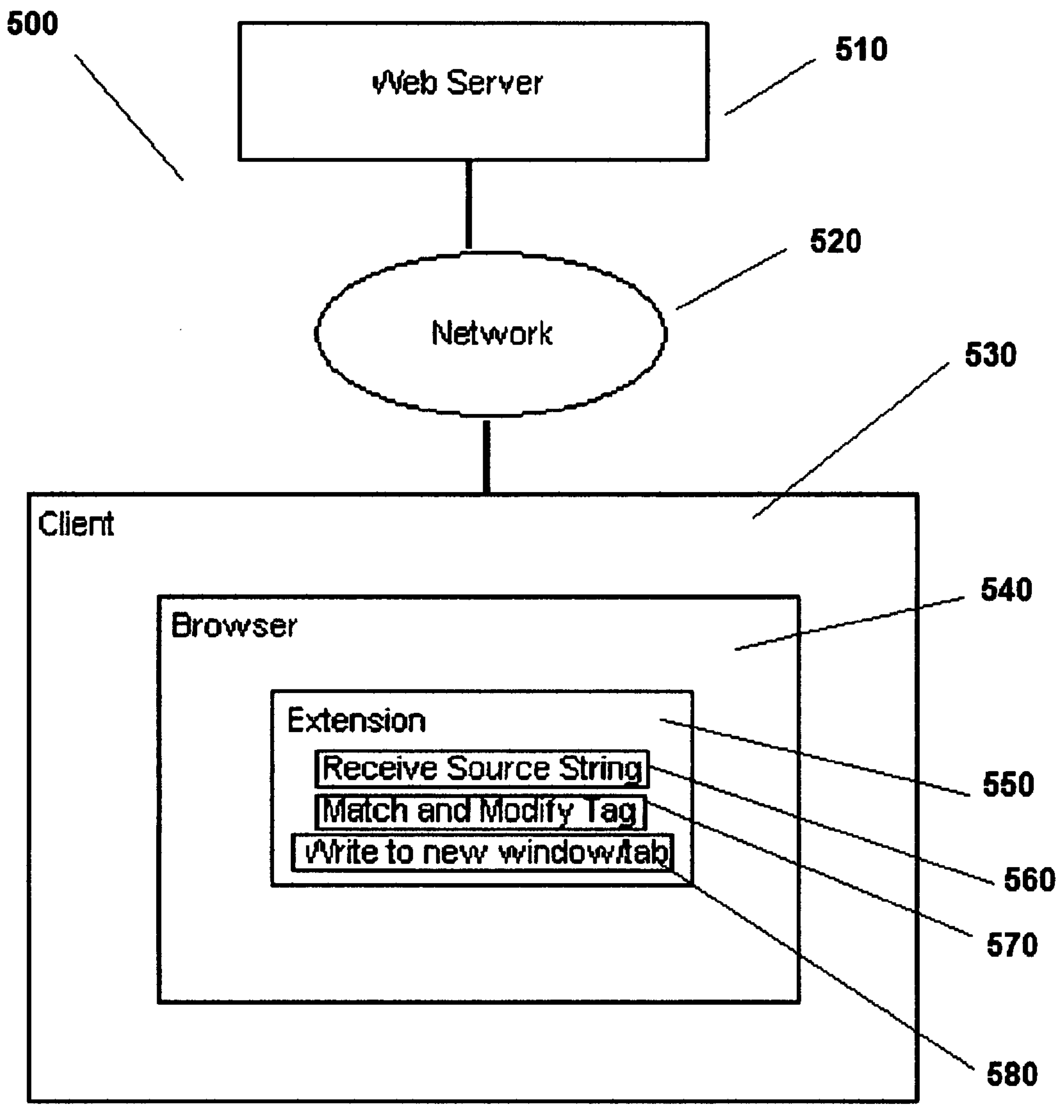

FIG. 5 is a block diagram depicting the present invention.

DETAILED DESCRIPTION OF THE INVENTION

The present invention is directed to a visualization tool for computer programming and markup language source code.

Figure 1:
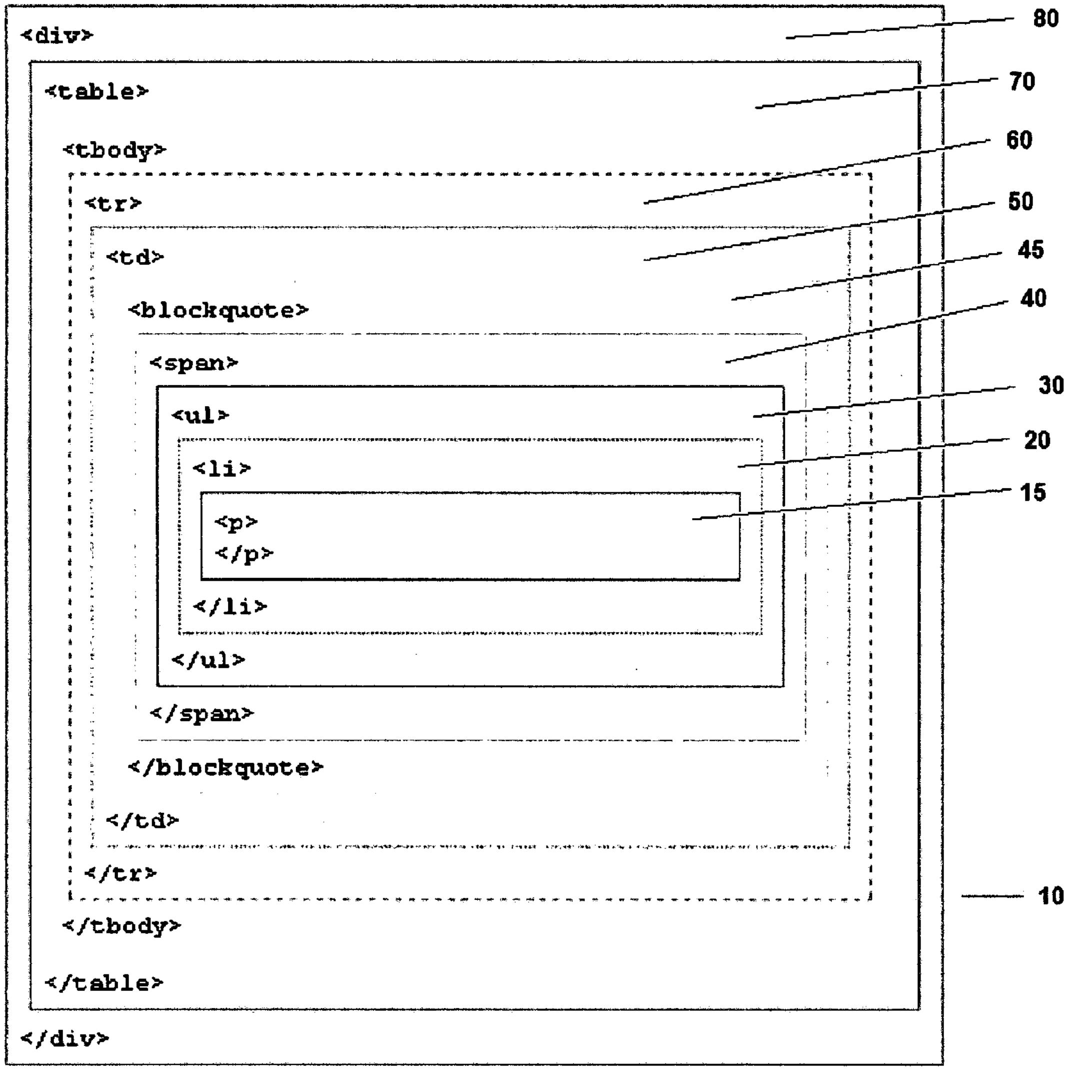
FIG. 1 is an example of a source chart of an HTML document's source code.

FIG. 1 illustrates a sample source chart 10, which is a particular embodiment of the present invention related to the visualization of source code, and particularly relates to an HTML document. Source charting is a new and innovative way to look at source code. One of the problems frequently associated with writing and debugging source code is identifying where various commands start and stop without having to read through each line of code to find the end of a grouping. With the present invention source code visualization tool one can easily identify where commands start and stop, making the writing and debugging process much easier. It clearly defines nested containers in an intuitive way, which allows for quick, clear and easy analysis of source code. The user who employs source charting can easily identify structure and hierarchy and thereby efficiently debug source code and/or make any changes or modifications that are necessary. Those new to the containment concept will with one glance at a source chart be over the learning curve. Intermediate and advanced developers can more efficiently track down bugs and/or make modifications in even complex documents. The more complex the program or document, the more useful the invention.

For example, FIG. 1 shows container 15, which in this illustration represents where the code would be visualized for the start of a new paragraph, which usually but do not necessarily render two carriage returns, producing a single blank line in between the two paragraphs. Of course, this is only illustrative and any code commands could be within this or any other container. By further way of example, with respect to container 15, the actual code directing operation would fall between ">" and "</". An illustrative example would be: "<p>INSERT TEXT</p>", where "INSERT TEXT" is where the text of the paragraph would be placed.

FIG. 1 goes on to show various nested containers. There can be any number of containers, and each container can represent any recognizable command in the language being programmed. By way of example, a container housing the code relative to the start of a new line is show in 20, a container housing the code relative to an unordered list is shown in 30, a container housing the code that would relate to setting a fixed font is show in 40, a container housing the code that would relate to the creation of a block quote is show in 45, a container housing the code that would relate to a single table cell is show in 50, a container housing the code that would relate to a table row is shown in 60, a container housing the code that relates to table attributes is how in 70 and a container housing the code that relates to simply defining a block of content in the page is show in 80.

As can be seen by referring to FIG. 1, even the most complicated nesting containers and hierarchies are easy to navigate. This is because each command sequence is contained within its own colored container. This is particularly helpful for html and other container language programming, but can be employed for any type of programming. By reading the chart's lines and colors side to side, once can visually navigate through the most complex document structure with ease.

Figure 2:
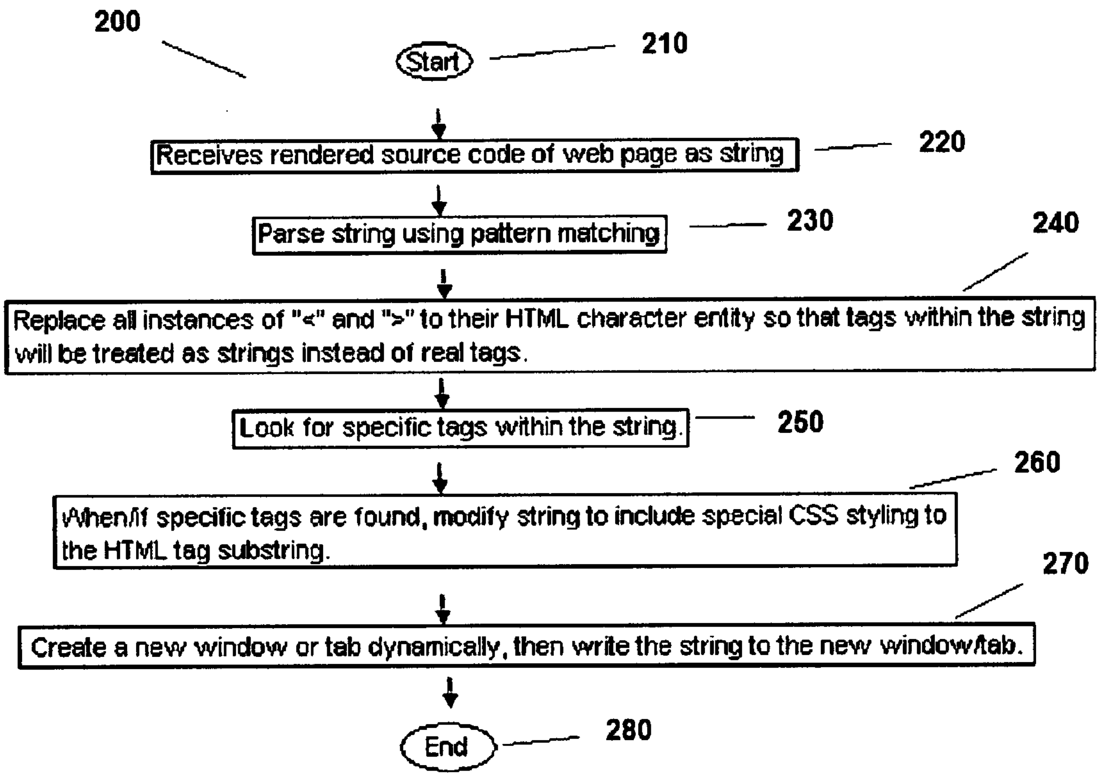
FIG. 2 is a flow chart depicting one particular implementation of the present invention.

FIG. 2 illustrates the current embodiment of the present invention, as an extension to the Firefox browser which creates a chart of a web page's rendered source code. From a technical standpoint, a charting program is stored within the browser, extending the functionality of the browser, ready to be invoked by the user from a context menu option labeled, "View Source Chart". When the option is selected by the user 220, the browser invokes a function which begins to parse the rendered source of that web page as a string literal 230. The system's first step involves converting all instances of less-than (<) and greater-than (>) symbols to their corresponding HTML character entities 240, so that when eventually written to a new window or tab, the string won't be rendered by the browser as tags, but as a string of plain text so that the user can view the source code tags in a charted state, rather than as the rendering of the original tags. The system then finds specific tags 250 and adds actual div tags with styling around them using CSS 260, so that each specified original tag and its contents will have a color coded, bordered container drawn around it. These div tags will be invisible to the user because the browser renders and uses them to format what the browser sees as plain text, but what the user views as charted source code. Once the entire string has been parsed and all the divs and styling has been added to the original string, the new HTML source code is pieced together to form the source for a new document. Then, according to a user's chosen options, the new source is printed to either a new window or a new tab's blank document 270, creating a new web page displaying the rendered source of the original document in a charted state, along with the ability for the user to collapse/expand containers due to a linked JavaScript file which is included in the charting extension.

Figure 3:
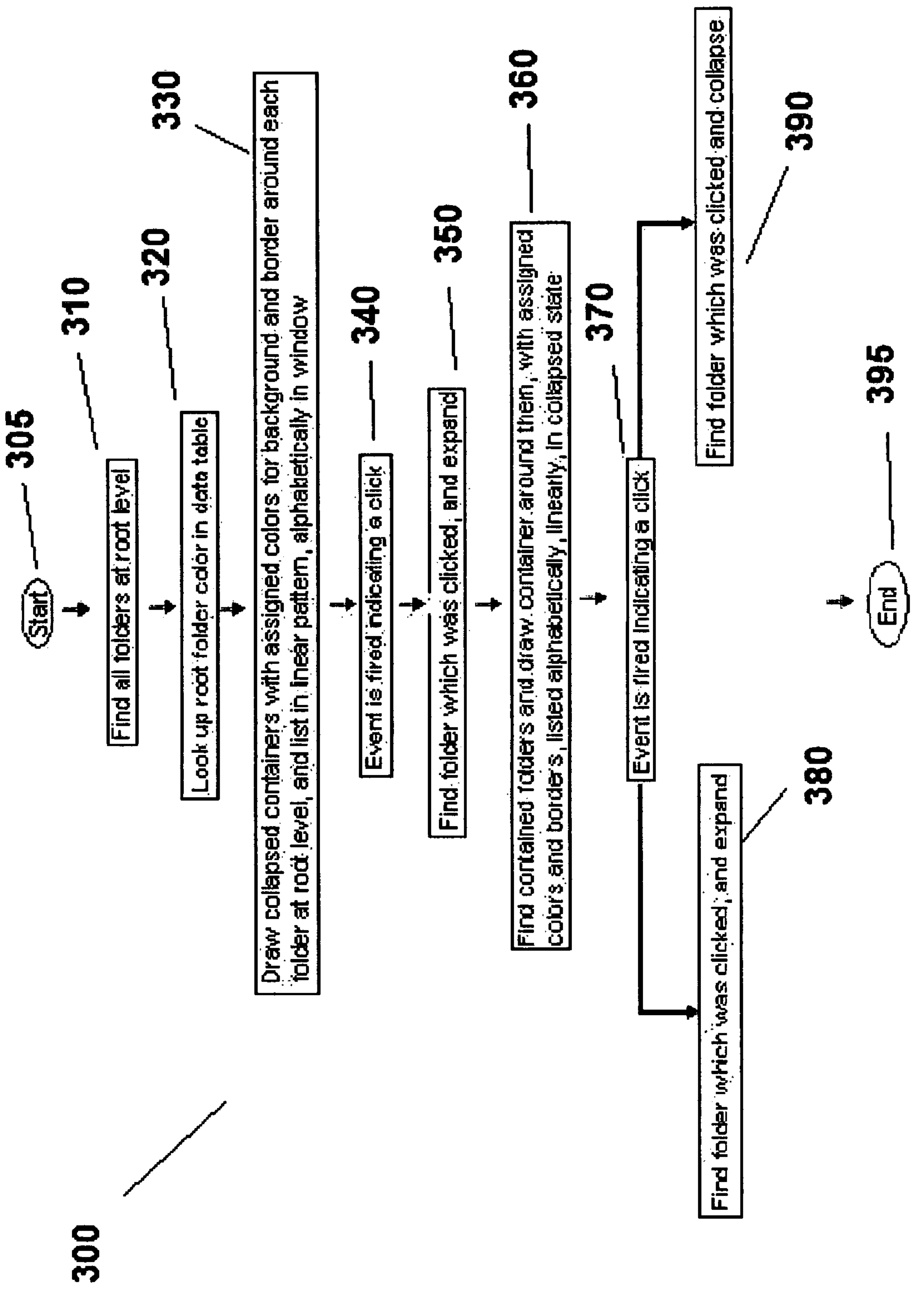
FIG. 3 is a flow chart depicting one particular implementation of the present invention.

FIG. 3 illustrates one particular implementation as the visualization tool for viewing complex file and folder hierarchies stored on hard drives. This example 3*b*, which is illustrative of the present invention, pertains to the situation where a user wishes to find a file or folder. User opens the program which allows them to view files and folders stored on a hard drive. User selects a folder to browse from a panel within the program window. In a separate panel of the window, or in a new window, the contents of that folder and the name of that folder are displayed within a colored, bordered container whose color indicates root level (root level within context of selected folder). Any folders contained within this folder are indicated by collapsed, color coded and bordered containers whose nested level indicates its position in relation to its parent folder and displays the folder name. User clicks on a collapsed container. Container expands, displaying all of it's contents which could be more files and folders. User click to expand any collapsed containers. User clicks to collapse any expanded containers.

From a technical standpoint, system displays all folders at root level of hard drive listed alphabetically and linearly within window. System displays folders as rectangular or square shaped containers in a collapsed state with specially assigned background and border colors and properties, folder names are printed within the container. System receives event indicating a folder has been clicked. System expands the clicked container and reveals its contents. Files are listed along with more folders which system will also draw colored, bordered container around in a collapsed state (state in which contents are not revealed). System assigns colors which represent the level at which a folder resides in relation to the root folder. When a collapsed container is clicked, system expands container to reveal any and all contents. When an expanded container is clicked, system collapses container to reveal only the folder name.

Figure 4:
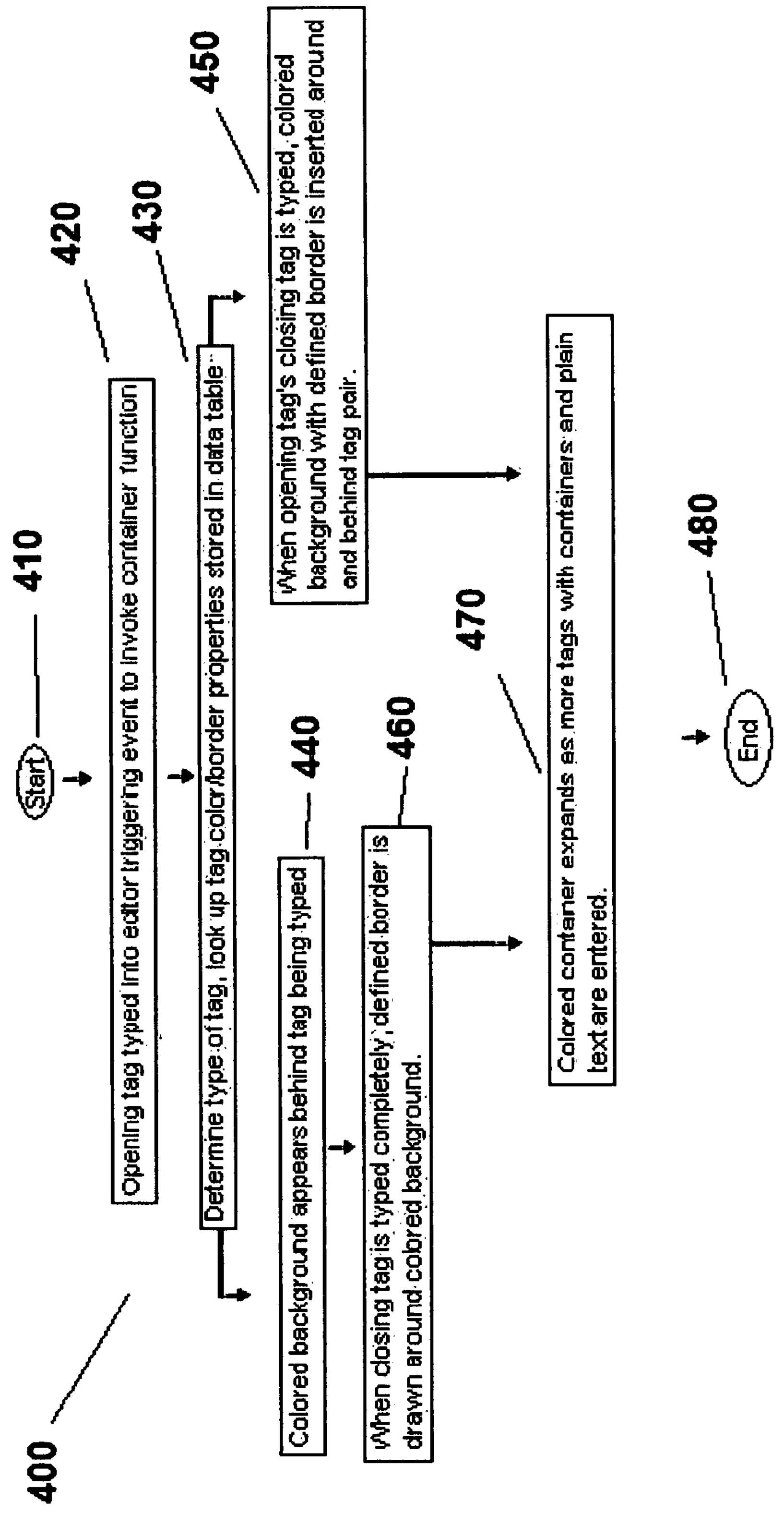
FIG. 4 is a flow chart depicting one particular implementation of the present invention.
Figure 4B:
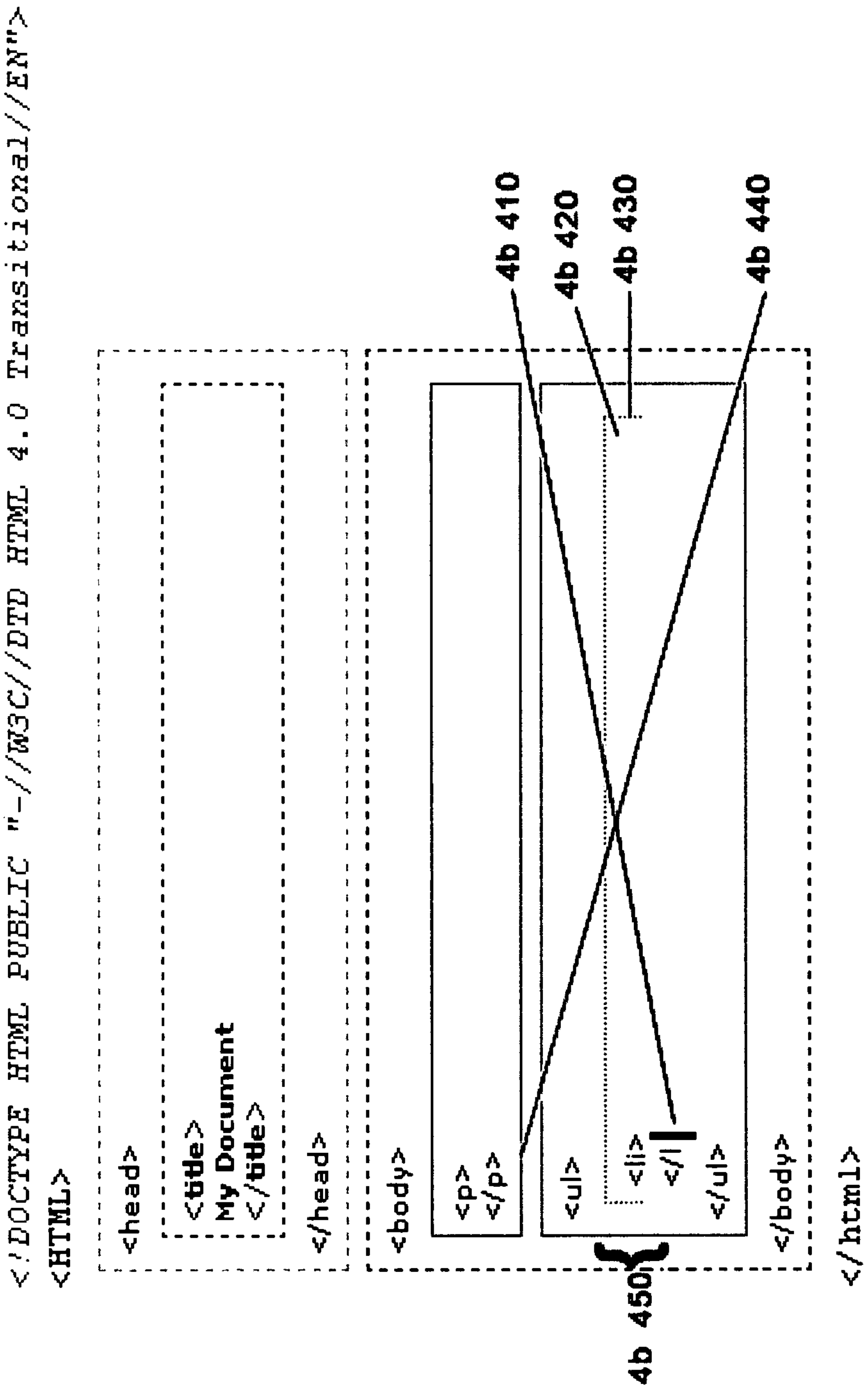

FIG. 4 & FIG. 4*b* illustrates one particular embodiment of the present invention, particularly relating to an implementation within a text editing tool for programming/web development. This example 400, which is illustrative of the present invention, pertains to the situation where a user is creating an HTML document. The user will start 410 by opening the text editor and begin to type HTML tags. After the user begins to type the tag pair, but before the closing tag is completely typed b410, the background color b420 and top and sides of the border b430 assigned to that tag pair appears around the tag. When the closing portion of the tag pair is typed, the bottom portion of the container's border is drawn, completing the border b 440. The containers expand when more tags and plain text are typed within the container borders b450. This enables a visual depiction of the natural boundaries of HTML tags, creating a more efficient way to comprehend the start and end points of tags, their hierarchical location, and the types of tags contained in a document.

From a technical standpoint, the keypress or similar event is triggered 420 when a tag is being typed which invokes a routine to begin adding a container around tag pair. Type of tag is determined 430 and a container with colored background 440 is inserted around bounding box of the tag. When closing tag has been entered completely, all four sides of the border is added to the colored container 450, signifying a complete tag pair. Optionally, the system could bypass partially inserting the colored container, and simply draw in the colored background and border upon the tag pair's closing tag being entered completely. The containers expand as more tags and their corresponding containers and other content is added inside an existing container 470.

FIG. 5 illustrates a block diagram of a computer system on which methods and apparatus consistent with the present invention may be implemented. FIG. 5 shows, for example, a web server 510, which interfaces with a network 520, which in turn interfaces with a client computer 530. It should, however, be clear to those of skill in the art that the present invention does not need to be delivered to a client computer by use of a web server, but could also be loaded directly to the client computer, or even could be loaded onto a network, thereby allowing access to all computers with access to the network.

In order to better understand the present invention a brief description of how the invention can be implemented in various circumstances follows. These specific embodiments are provided for illustration only and not intended to limit the invention in any way.

Also attached to this filing is one particular embodiment of the source code that is illustrative of the code that could be used to implement the present invention and the functionality described herein. The rendered source is returned by the browser as a string when invoking the JavaScript method, "getElementsByTagName("html")[0].innerHTML"

Before tags are styled and color coded, comment filtering should take place. First, any tags found within a comment tag pair are altered so they will not be modified as non-commented tags. The method of filtering I used for comments is to insert a space immediately after a tag's less than symbol and one immediately before each tag's greater than symbol. This prevents pattern matching of the form, "<tagNameHere" because now commented tags are in the form, "<tagNameHere. Alternatively, I could have chosen to simply remove comment tag contents, store them in an array, then re-insert them after styling and formatting has taken place.

Filtering of JavaScript appearing between script tags should be removed to prevent formatting and styling of tags stored as JavaScript strings. Also, the Firefox browser doesn't return an entire script when document.write( ) method is used, so filtering it completely prevents confusion to the user as to why part of their script is missing.

Next is the fun part; adding styling and formatting to tags. First though, less than and greater than symbols must be replaced by their character entities, "<" and "> so that the browser will treat them as plain text (I'll refer to these converted tags as presentational tags) rather than tags to render (I'll refer to these as renderable tags) when the modified string is ready to be written to a new, dynamically generated page. Now the string is divided into substrings. These substrings are presented as tags to a viewer, but treated as plain text by the browser, and include all contents of the converted tag. There are 2 substrings for each presentational tag, the first substring being the opening less than symbol, followed by the tag name ("<table"). The last substring for each tag is the presentational closing tag. The first substring is modified by inserting a renderable container tag complete with CSS styling corresponding to the type of presentational tag it is representing. The second substring inserts the renderable closing tag matching the renderable opening tag in the first substring after the presentation tag, resulting in the presentational tag pair and all its contents being displayed by the browser within a renderable container. I chose to use a series of split( ) and join( ) functions, but one could also use regular expressions to insert and otherwise modify the substrings.

Finally, the modified rendered source string is ready to be written to a blank document in a new window or tab. A new window or tab is generated and the string is printed to the blank document contained by the window or tab.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. For example, the specific examples provided discuss both containment and color. While employing containment and color is preferable, the use of one or the other is also a variation within the scope of the present invention.

What is claimed is:

1. A hardware implemented computer program product executed by a processor to perform the method, comprising:
- a parser;
- the parser receiving a markup language input, and parsing the input using pattern matching;
- modifying the markup input to include a pictorial visualization of the structure formed by the arrangement of markup elements within in the markup language input, wherein the visualization conveys a parent and child relationships between one or more parent markup language elements and their one or more child markup language elements by adding a visual indicator of element boundaries, and wherein the one or more child markup language element's visual indicator is distinguished from and entirely contained within its parent markup language element's visual indicator; and displaying the modified markup language input.

2. The method of claim 1, wherein a visual indicator comprises a color shaded region, the one or more child markup language element's color shaded region being surrounded by its parent markup language element's color shaded region.

3. The method of claim 1, wherein a visual indicator comprises a border, the one or more child markup language element's border being enclosed within its parent markup language element's border.

4. A hardware implemented computer program product executed by a processor to perform the method comprising:
- a parser;
- the parser receiving a computer program input, and parsing the computer program input using pattern matching;
- modifying the computer program input to include a pictorial visualization of the structure formed by the arrangement of code blocks within a computer program, wherein the visualization conveys parent and child relationships between the one or more parent code blocks and their one or more child code blocks by adding a visual indicator of code block boundaries, and wherein the one or more child code block's visual indicator is distinguished from and entirely contained within its parent code block's visual indicator; and
- displaying the modified computer program input.

5. The method of claim 4, wherein a visual indicator comprises a color shaded region, the one or more child code block's color shaded region being surrounded by its parent code block's color shaded region.

6. The method of claim 4, wherein a visual indicator comprises a border, the one or more child code block's border being enclosed within its parent code block's border.

7. A hardware implemented computer program product executed by a processor to perform the method, comprising:
- a parser;
- the parser receiving a markup language input, and parsing the input using pattern matching;
- generating a modified markup language input, wherein the modified markup language document includes a pictorial visualization of the structure formed by the arrangement of markup elements within in the markup language input, wherein the visualization conveys parent and child relationships between one or more parent markup language elements and their one or more child markup language elements by adding a visual indicator of element boundaries, and wherein the one or more child markup language element's visual indicator is distinguished from and entirely contained within its parent markup language element's visual indicator; and
- displaying the generated markup language input.

8. The method of claim 7, wherein a visual indicator comprises a color shaded region, the one or more child markup language element's color shaded region being surrounded by its parent markup language element's color shaded region.

9. The method of claim 7, wherein a visual indicator comprises a border, the one or more child markup language element's border being enclosed within its parent markup language element's border.

10. A hardware implemented computer program product executed by a processor to perform the method comprising:
- a parser;
- the parser receiving a computer program input, and parsing the computer program input using pattern matching;
- generating a modified computer program input to include a pictorial visualization of the structure formed by the arrangement of code blocks within a computer program, wherein the visualization conveys parent and child relationships between the one or more parent code blocks and their one or more child code blocks by adding a visual indicator of code block boundaries, and wherein the one or more child code block's visual indicator is distinguished from and entirely contained within its parent code block's visual indicator; and
- displaying the generated computer program input.

11. The method of claim 10, wherein a visual indicator comprises a color shaded region, the one or more child code block's color shaded region being surrounded by its parent code block's color shaded region.

12. The method of claim 10, wherein a visual indicator comprises a border, the one or more child code block's border being enclosed within its parent code block's border.

* * * * *